United States Patent [19]

Zrostlik

[11] Patent Number: 5,907,269
[45] Date of Patent: May 25, 1999

[54] MAGNETOSTRICTIVE CLAMPING DEVICE

[75] Inventor: Rick L. Zrostlik, Ames, Iowa

[73] Assignee: Etrema Products, Inc., Ames, Iowa

[21] Appl. No.: 08/871,597

[22] Filed: Jun. 6, 1997

[51] Int. Cl.[6] .................................................. H01F 7/00
[52] U.S. Cl. ............................................. 335/215; 335/3
[58] Field of Search ......................... 335/215, 3; 310/26; 228/4.5

[56] References Cited

U.S. PATENT DOCUMENTS

| | | | |
|---|---|---|---|
| 5,101,183 | 3/1992 | Dixon | 335/3 |
| 5,184,037 | 2/1993 | Kobayashi et al. | 310/26 |
| 5,314,175 | 5/1994 | Izumi et al. | 269/224 |
| 5,323,948 | 6/1994 | Yamazaki et al. | |
| 5,388,751 | 2/1995 | Harada et al. | 228/4.5 |
| 5,435,477 | 7/1995 | Torihata et al. | 228/4.5 |

OTHER PUBLICATIONS

Sewell, et al., "Comparison of Magnetic Biasing Techniques for Terfenol D," (1990 or earlier) Presented at 2nd Intl. Conference on Giant Magnetostrictive and Amorphous Alloys for Actuators and Sensors, 29 pages.

Design Idea of the Month, "Magnetostrictive materials find use in ultrasonic welding," (May 1991), one sheet.

Hansen, et al., "Ultrasonic Applications Using Magnetostrictive Smart Materials," (Nov. 1994), 6 pages.

Crawford, "Eastern European Advances in Ultrasonics and Acoustics," (Nov. 1995) Presented at the Ultrasonic & Acoustic Transducer Group Meeting, NPL, Teddington, UK, 16 pages.

Etrema Products, Inc., "Etrema Terfenol–D Magnetostrictive Actuators," (1993 or earlier), 6 pages.

Goodfriend, et al., "Characteristics of the Magnetostrictive Alloy Terfenol–D produced for the manufacture of devices," (1992 or earlier), 10 pages.

Goodfriend, et al., "High force, high strain, wide band width linear actuator using the magnetostrictive material, Terfenol–D," (1993 or earlier), 12 pages.

Etrema Products, Inc., "Etrema Terfenol–D Magnetostrictive Actuators," (Dec. 31, 1995 or earlier) 4 pages.

Butler, J.L., "Application Manual for the Design of Etrema Terfenol–D Magnetostrictive Transducers," (1988) pp. 1–67.

Hiller, et al., "Attention and Transformer of Vibration Through Active Control of Magnetostrictive Terfenol," Jour. of Sound and Vibration (1989) vol. 134, No. 3, pp. 507–519.

Miller, "High Force, High Strain, Wide Bandwidth Linear Actuators Using the Magnetostrictive Material Terfenol–D," (1991) Proceedings on the Conference on Recent Advances in Active Control of Sound and Vibration, Technomic Publishing Co., Inc., Lancaster, PA, 9 pages.

Harris, C.M., "Shock and Vibration Handbook," 3rd edition, pp. 25–1 to 25–26, McGraw–Hill, NY, NY (1988, month unknown).

Edge Technologies, Inc., Etrema Products Division, "Terfenol–D Notes," (Jan. 1991) vol. 4, #1, 4 pages.

Edge Technologies, Inc., Etrema Products Division, "Magnetostrictive Actuators," (Date unknown) 3 pages.

Edge Technologies, Inc., "Magnetostrictive Actuators," (Published in 1992, estimate) 4 pages.

Primary Examiner—Lincoln Donovan
Assistant Examiner—Tuyen T. Nguyen
Attorney, Agent, or Firm—Flehr Hohbach Test; Albritton & Herbert LLP

[57] ABSTRACT

A magnetostrictive clamping device which includes first and second arm members having respective first and second end portions. The first and second arm members are interconnected to permit relative movement between the first and second end portions between a first position in which the first and second end portions are spaced apart and a second position in which the first and second end portions are spaced closer together. An actuator is included for causing relative movement between the first and second arm members from the first position to the second position. The actuator has a drive element made from a magnetostrictive material. An electromagnetic field extends through at least a portion of the drive element. The drive element is changeable between a first shape when in the absence of the electromagnetic field and a second shape when in the presence of the electromagnetic field.

23 Claims, 2 Drawing Sheets

MAGNETOSTRICTIVE CLAMPING DEVICE

This invention pertains generally to clamping devices and, more particularly, to clamping devices having actuators with active elements.

Clamping devices have heretofore been provided for use in the manufacture of semiconductor devices. These devices, however, suffer from a number of disadvantages. Some of these clamping devices have drivers utilizing piezoceramic elements which require relatively high input voltages. High voltages can be costly to provide. Solenoid type clamping devices use voice coils, which are relatively slow and thus limit the response time and throughput of the device. Some clamping devices use flexure joints, which have a useful life shorter than the other components of the device. The relatively high weight of some of these devices limits the speed at which the machine to which the device is attached can be moved. There is, therefore, a need for a new and improved clamping device.

In general, it is an object of the present invention to provide a clamping device which utilizes a smart material actuation element made from a giant magnetostrictive material.

Another object of the invention is to provide a clamping device of the above character which is relatively small and lightweight.

Another object of the invention is to provide a clamping device of the above character which requires relatively low input voltages.

Another object of the invention is to provide a clamping device of the above character which significantly amplifies the motion of the magnetostrictive material.

Another object of the invention is to provide a clamping device of the above character which utilizes a pivot pin for permitting relative movement of the clamping arms.

Another object of the invention is to provide a clamping device of the above character which inhibits backlash from the pin joint following wear of the joint.

Additional objects and features of the invention will appear from the following description from which the preferred embodiment is set forth in detail in conjunction with the accompanying drawings.

In general, a magnetostrictive clamping device is provided which includes first and second arm members having respective first and second end portions. The device has means for interconnecting the first and second arm members for permitting relative movement between the first and second end portions between a first position in which the first and second end portions are spaced apart and a second position in which the first and second end portions are spaced closer together. Means including an actuator causes the relative movement of the first and second arm members from the first position to the second position. The actuator has a drive element made from a magnetostrictive material and means for producing an electromagnetic field which extends through at least a portion of the drive element. The drive element is changeable between a first shape when in the absence of the electromagnetic field and a second shape when in the presence of the electromagnetic field.

Figure 1:
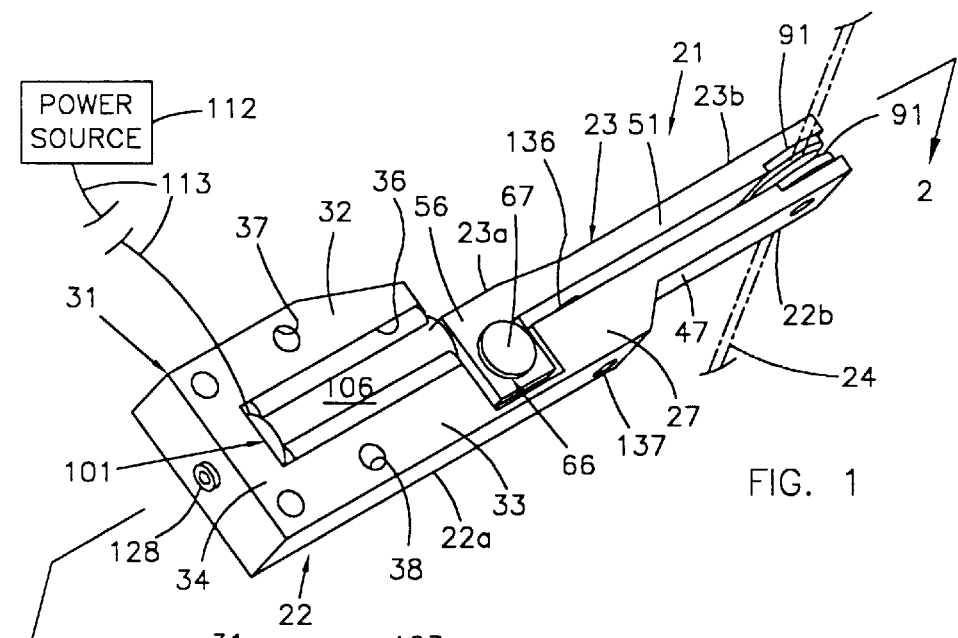
FIG. 1 is an isometric view of a magnetostrictive clamping device of the present invention.
Figure 2:
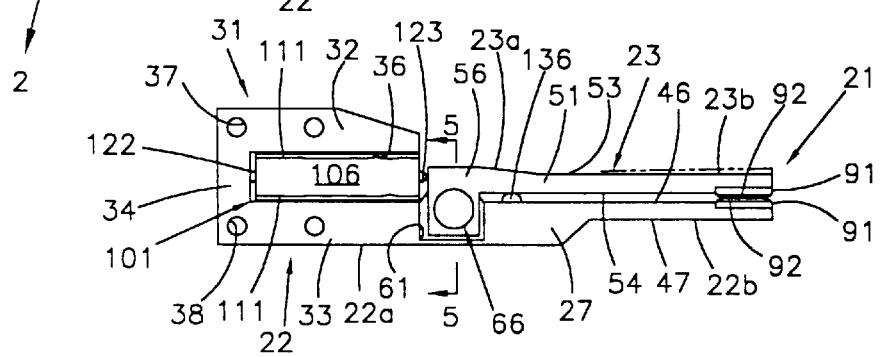
FIG. 2 is a side elevational view of the magnetostrictive clamping device of FIG. 1 taken along the line 2—2 of FIG. 1.
Figure 3:
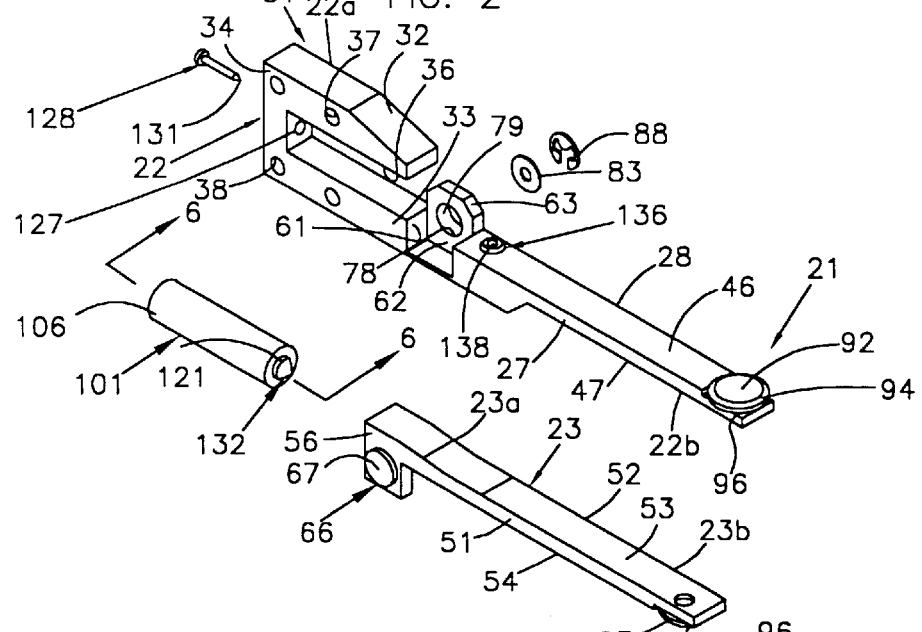
FIG. 3 is an exploded upside down view of the magnetostrictive clamping device of FIG. 1.

More in particular, the relatively small magnetostrictive clamping device 21 of the present invention includes a first arm member in the form of static arm 22 and a second arm member in the form of dynamic arm 23 (see FIGS. 1–3). Arms 22 and 23 have respective first or proximal end portions or extremities 22a and 23a and second or distal end portions or extremities 22b and 23b. Proximal extremities 22a and 23a are pivotably coupled together to permit distal extremities 22b and 23b to open and close for grasping a suitable object such as an electronic die bonding wire 24, shown in phantom lines in FIG. 1, in a process for attaching the wire 24 to a bonding location on an integrated circuit. Wire 24 has a diameter ranging from approximately 18 to 75 microns. Clamping device 21 is relatively lightweight and has a mass of approximately 10 grams or less. Static and dynamic arms 22 and 23 are each made from any suitable material such as 7075-T6 aluminum. The device 21 has a length of approximately 2.6 inches and a width of approximately 0.6 inch.

Generally planar static arm 22 is formed from first and second opposite surfaces 27 and 28 which extend in directions generally parallel to each other and are spaced apart a distance of approximately 0.16 inch (see FIGS. 1–3). Proximal extremity 22a of the static arm 22 has a portion 31 adapted for mounting clamping device 21 to any suitable apparatus such as a mounting plate or mounting surface of a semiconductor wire bonding machine (not shown). First and second spaced-apart arm portions 32 and 33 of mounting portion 31 extend generally parallel to each other and an interconnecting portion 34 extends perpendicularly between the arm portions 32 and 33. A recess 36 is provided between first and second arms portions 32 and 33. As such, the mounting portion 31 is generally C-shaped in conformation. Mounting portion 31 has a length of approximately 0.9 inch. Second arm portion 33 extends longitudinally in line with distal extremity 22b of the static arm 22. A plurality of at least two bores 37 extend perpendicularly between surfaces 27 and 28 of first arm portion 32 and an additional plurality of at least two bores 38 extend perpendicularly between surfaces 27 and 28 of second arm portion 33. Bolts (not shown) extend through the bores 37 and 38 for securing clamping device 21 to the mounting plate or surface of the wire bonding machine. Distal extremity 22b is generally strip-like and formed with a third or top planar surface 46 and a fourth or bottom planar surface 47 extending perpendicularly between surfaces 27 and 28. Surfaces 46 and 47 are spaced apart a distance of approximately 0.08 inch.

Figure 4:
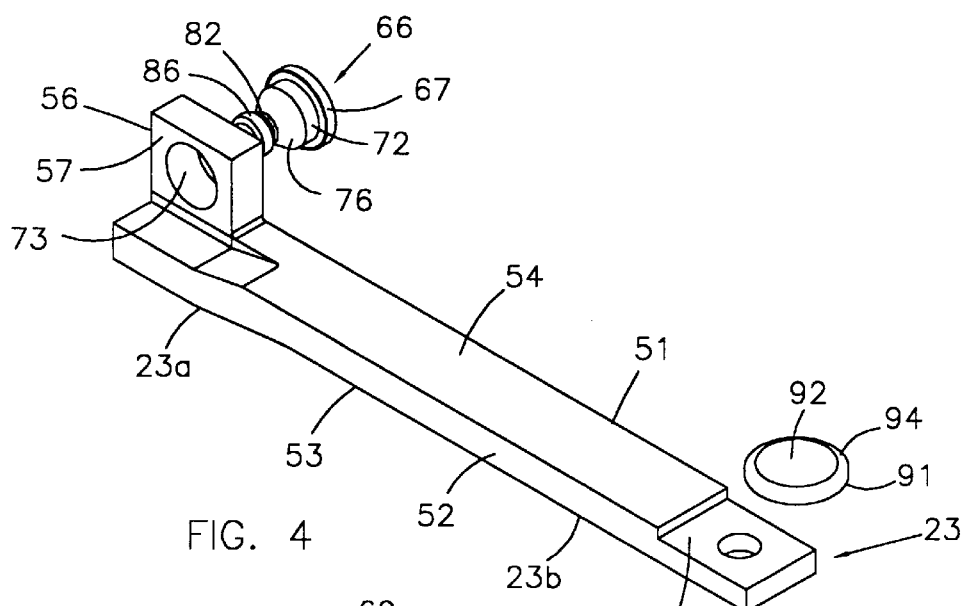
FIG. 4 is an exploded view of the dynamic arm of the magnetostrictive clamping device of FIG. 1.

Dynamic arm 23 is formed with first and second opposite planar surfaces 51 and 52 extending parallel to each other and spaced apart a distance of approximately 0.157 inch (see FIGS. 1–4). A third or top surface 53 and a fourth or bottom surface 54 extend perpendicularly between first and second surfaces 51 and 52. Proximal extremity 23a has a plate portion 56 depending from bottom surface 54. First surface 51 is the outer surface of plate portion 56. A planar surface 57 extending parallel to surface 51 and spaced inwardly therefrom forms the inner surface of plate portion 56. Inner surface 57 is recessed inwardly from second surface 52 of the dynamic arm 23 as shown in FIG. 4. Top and bottom surfaces 53 and 54 are spaced apart a distance of approximately 0.08 inch at distal extremity 23b of the dynamic arm 23.

Figure 5:
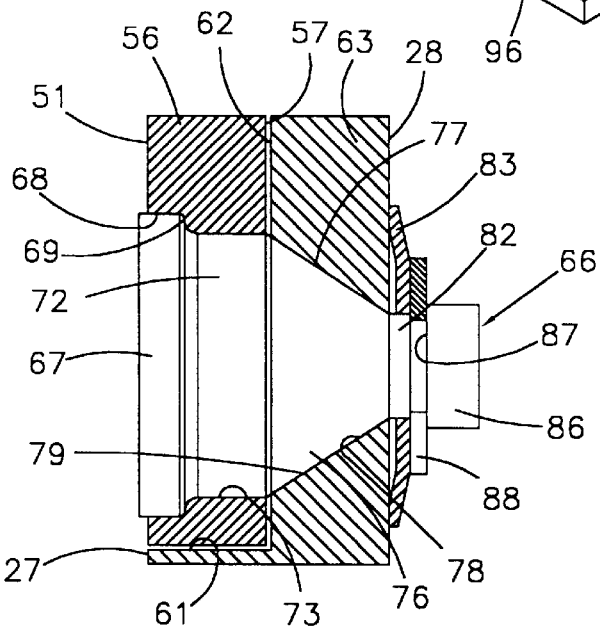
FIG. 5 is a cross-sectional view of the magnetostrictive clamping device of FIG. 1 taken along the line 5—5 of FIG. 2.

Clamping device 21 has means for pivotably interconnecting or coupling proximal extremities 22a and 23a of static and dynamic arms 22 and 23. In this regard, proximal extremity 22a has a recess 61 provided in first surface 27 for receiving plate portion 56 of dynamic arm 23 (see FIGS. 2, 3 and 5). Recess 61 is formed in part by an inner planar surface 62 extending parallel to first surface 27. The inner surface 62 is spaced apart from second surface 28 a distance of approximately 0.073 inch and together with the second surface 28 forms plate portion 63 of static arm 22. When plate portion 63 is disposed within recess 61, inner surfaces 57 and 62 extend parallel to each other and are spaced apart a distance of approximately 0.0004 inch (see FIG. 5). First and second surfaces 51 and 52 of the dynamic arm 23 lie in the same respective planes as first and second surfaces 27 and 28 of the static arm 22.

The means for pivotably interconnecting proximal extremities 22a and 23a includes pivot pin 66 which serves as pivot pin means for clamping device 21. Pivot pin 66, shown most clearly in FIGS. 4 and 5, extends perpendicularly between plate portions 56 and 63. The transversely-extending pivot pin 66 has a first end portion in the form of an annular disk 67 which seats within an annular recess 68 provided in first surface 51 of plate portion 56. Recess 68 is formed in part by an annular shoulder 69 which abuts disk 67. Pivot pin 66 necks down to a first annular portion 72 which has an outer diameter of approximately 0.157 inch and s disposed in a bore 73 that communicates with annular recess 68. Bore 73 extends through inner surface 57 of dynamic arm 23 and has an inner diameter of approximately 0.157 inch.

Pivot pin 66 has a frustoconical portion 76 formed by a tapered surface 77 extending radially inwardly at an angle of approximately 30° from first annular portion 72. Frustoconical portion 76 cooperatively mates with a bore 78 extending perpendicularly between surfaces 62 and 28 of plate portion 63. Bore 78 is formed by a tapered surface 79 extending radially inwardly from inner surface 62 at an angle of approximately 30°. Pivot pin 66 has a second annular portion 82 which extends from frustoconical portion 76 perpendicularly outwardly from second surface 28 of static arm 22. Annular spring means in the form of curved spring washer 83 is concentrically disposed about second annular portion 82. Spring washer 83 can be of any conventional type such as Part No. U093-0056-S of Associated Spring located in Maumee, Ohio. Pivot pin 66 further includes an enlarged cylindrical end cap 86 spaced outwardly from second annular portion 82 by an annular recess 87. A conventional retainer such as E-style retaining ring 88 is disposed within recess 87. Retaining ring 88 serves to compress spring washer 83 against plate portion 63 to thus urge tapered surface 76 of the plate portion against tapered surface 77 of frustoconical portion 76. The spacing between surfaces 57 and 62 permits transverse movement of plate portion 56 relative to plate portion 63.

Although clamping device 21 has been described as having a static or stationary arm 22 and a dynamic or movable arm 23 pivotably interconnected by means of a pin 66, it should be appreciated that a clamping device having two dynamic arms interconnected by a pivot pin can be provided and be within the scope of the present invention. Alternatively, a further embodiment of the clamping device described herein having a flexure instead of a pivot pin can be provided. In such an alternative embodiment, a static arm in combination with a dynamic arm or two dynamic arms can be provided.

Means including first and second grab pads 91 are carried by the ends of static and dynamic arms 22 and 23 for gripping bonding wire 24 (see FIGS. 1–4). Grab pads 91 are each made from any suitable dielectric material such as a ceramic material. The pads 91 are disk-like in conformation and are formed from outer and inner planar surfaces 92 and 93 extending in parallel directions. A rounded edge 94 extends circumferentially around each of the grab pads for adjoining surfaces 92 and 93. Grab pads 91 are secured within respective recesses 96 provided in distal extremities 22b and 23b by any suitable means such as an electro-conductive paste (not shown). Bores extend through each of distal extremities 22b and 23b into recesses 96 to aid in the removal of the grab pads 91 by applying force to inner surfaces 93 of the grab pads.

Pivot pin 66 permits distal extremity 23b of dynamic arm 23 and distal extremity 22b of static arm 22 to pivot relative to each other between a first position in which the extremities 23b and 22b are spaced apart and a second position in which the extremities 23b and 22b are spaced closer together. More specifically, outer surface 92 of the grab pad 91 on dynamic arm 23 generally abuts outer surface 92 of the grab pad 91 on static arm 22, as shown in solid lines in FIGS. 1–3, when arms 22 and 23 are in the second position. The grab pad outer surface 92 of dynamic arm 23 is spaced apart from the grab pad outer surface 92 of static arm 22 when the arms 22 and 23 are in the first position. Static arm 22 is shown in its first position by the phantom lines in FIG. 2.

Figure 6:
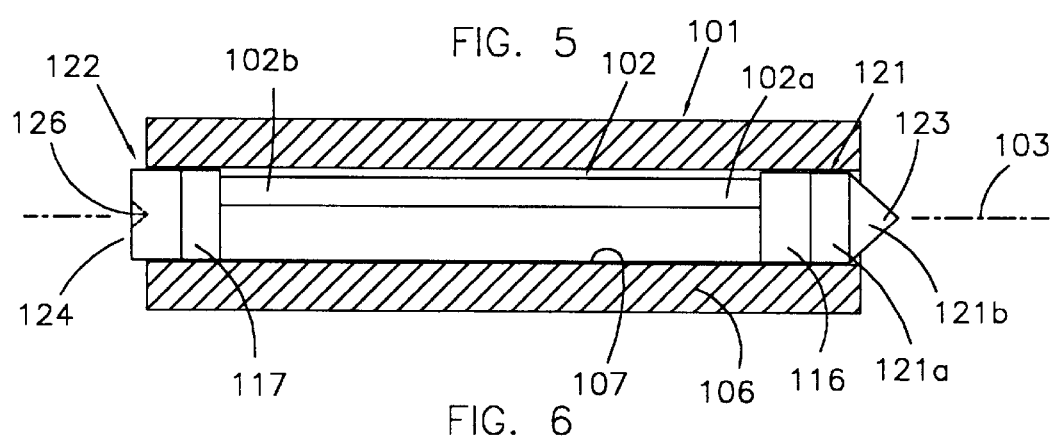
FIG. 6 is a cross-sectional view of the driver of the magnetostrictive clamping device of FIG. 1 taken along the line 6—6 of FIG. 3.

An actuator 101 is included within the means of clamping device 21 for causing relative movement of arms 22 and 23 between their first and second positions and specifically for moving dynamic arm 23 between its opened and closed positions relative to static arm 22. Actuator 101, as shown in FIG. 6, includes an elongate cylindrical drive element in the form of a drive rod 102 extending along a central longitudinal axis 103. Drive rod 102 has a first or front end portion 102a and a second or rear end portion 102b. The drive rod 102 has a length of approximately 0.59 inch and a cross-sectional width and thickness which are each approximately 0.079 inch. As such, the drive rod 102 has a cross section which is generally square and constitutes a right square cylinder. It should be appreciated that drive rod 102 can be in the form of a circular cylinder and be within the scope of the present invention.

Drive rod 102 is changeable between a first or shortened shape when in the absence of a magnetic field and a second or elongated shape when in the presence of a magnetic field. In this regard, the drive rod 102 is made from any suitable active or smart material which changes shape when energized by being placed in a magnetic field. The suitable active materials for drive rod 102 include magnetostrictive materials which change shape in response to an applied magnetic field. A giant magnetostrictive material is preferred because such a material can tolerate high mechanical stress so as to have a relatively high energy density. High energy density enables more mechanical power output from a given electrical power input and volume of smart material which thus reduces the size and weight of clamping device 21. Preferred giant magnetostrictive materials are rare earth materials, rare earth-transition metal materials and compositions having rare earth materials, transition metals and other elements.

Preferred rare earth materials for operating temperatures ranging from 0° to 200° K are rare earth binaries such as $Tb_xDy_{1-x}$, where x ranges from 0 to 1. Other rare earth elements can be added or substituted for either terbium or dysprosium in this base alloy. For example, holmium, erbium or gadolinium can be used in place of either terbium or dysprosium. Other preferred rare earth materials for operating temperatures ranging from 0° to 200° K are body centered cubic intermetallic compounds such as $(Tb_xDy_{1-x})(Zn_yCd_{1-y})$, where x ranges from 0 to 1, y ranges from 0 to 1 and x+y=1. Other rare earth elements, such as holmium, erbium or gadolinium, can be added or substituted for either terbium or dysprosium in these body centered cubic intermetallic compounds.

Preferred rare earth-transition metal materials are rare earth-iron materials such as TERFENOL based alloys. These alloys are suited for operating temperatures ranging from 0° to 700° K. One of these alloys is $TbFe_2$. Particularly preferred rare earth-iron materials for operating in the 0° to 700° K operating range are disclosed in U.S. Pat. Nos. 4,308,474; 4,609,402; 4,770,704; 4,849,034 or 4,818,304, incorporated herein by this reference, nd include the material known as TERFENOL-D sold by Etrema Products, Inc. of Ames, Iowa. TERFENOL-D is a metal alloy formed from the elements terbium, dysprosium and iron and has the formula of $Tb_xDy_{1-x}Fe_{2-w}$, where x ranges from 0 to 1 and w ranges from 0 to 1. A preferred formula for TERFENOL-D is $Tb_xDy_{1-x}Fe_{1.90-1.95}$, where x ranges from 0.25 to 1.0. The particularly preferred formula for the TERFENOL-D material of drive rod 102 is $Tb_{.3}Dy_{.7}Fe_{1.92}$. Other rare earth materials, such as cerium, praseodymium, neodymium, holmium, erbium or gadolinium, can be added or substituted for terbium or dysprosium for property enhancement purposes. For example, a giant magnetostrictive material having the rare earth materials $R^1_{x1}$, $R^2_{x2}$, $R^3_{x3}$ ... $R^n_{xn}$ can be provided where $R^1, R^2, R^3$ ... $R^n$ constitute rare earth materials and $x1+x2+x3$ ... $+xn=1$. Other transition metals, such as manganese, cobalt or nickel, can be added or substituted for iron as disclosed in U.S. Pat. No. 5,110,376, incorporated herein by this reference. Elements which are not transition metals, such as aluminum, can also be added or substituted for iron. For example, a giant magnetostrictive material having the elements $T^1_{y1}$, $T^2_{y2}, T^3_{y3}$ ... $T^n_{yn}$ can be provided where $T^1, T^2, T^3$ ... $T^n$ constitute transition metals or elements such as aluminum and $y1+y2+y3$ ... $+yn=2-w$. Alternatively, an intermetallic compound can be provided having combinations or variations of TERFENOL-D, such as $(Tb_{x1}, Dy_{x2}, R^3_{x3}, R^4_{x4}$ ... $R^n_{xn})(Fe_{y1}, T^2_{y2}, T^3_{y3}$ ... $T^n_{yn})_{2-w}$ where $x1+x2+x3$ ... $+xn=1$, $y1+y2+y3$ ... $+yn=2-w$, and w ranges from 0 to 1.

Giant magnetostrictive materials which shorten and thus exhibit negative magnetostriction when placed in a magnetic field can be used for the material of drive rod 102 and be within the scope of the present invention. These negative magnetostrictive materials have formulations similar to the giant magnetostrictive materials described above except that they include the rare earth element samarium. Preferred negative magnetostrictive materials for operating temperatures ranging from 0° to 700° are SAMFENOL based alloys such as $SmFe_2$. A particularly preferred SAMFENOL based alloy is SAMFENOL-D, which is also disclosed in U.S. Pat. Nos. 4,308,474; 4,609,402; 4,770,704; 4,849,034 or 4,818, 304 and has the formula $Sm_xDy_{1-x}Fe_{2-w}$, where x ranges from 0 to 1 and w ranges from 0 to 1. Other rare earth materials, such as cerium, praseodymium, neodymium, holmium, erbium or gadolinium, can be added or substituted for samarium or dysprosium in the same manner as discussed above with respect to TERFENOL based alloys. In addition, other transition metals, such as manganese, cobalt or nickel, and elements which are not transition metals, such as aluminum, can be added or substituted for iron in the same manner as also discussed above.

A drive coil 106 concentrically disposed about drive rod or magnetostrictive driver 102 is included within the means of clamping device 21 for producing an electromagnetic field which extends through at least a portion of drive rod 102. Coil 106 is tubular in conformation and is provided with a bore 107 extending longitudinally therethrough for receiving the drive rod 102. Rod 102 and coil 106 are relatively sized so that the drive rod floats within the coil 106. The drive coil 106 has inner and outer diameters of approximately 0.114 inch and 0.22 inch, respectively, and a length of approximately 0.77 inch. Coil 106 is made from an electrically conductive material in the form of 28 AWG S Build copper wire (not shown). The wire is potted together by any suitable epoxy (not shown) such as DURALCO 128, sold by Cotronics located in Brooklyn, N.Y. Drive coil 106 has four layers of the copper wire. Each of the four layers has 57 turns.

Actuator 101 is carried by mounting portion 31 of static arm 22. In this regard, the actuator 101 is disposed in recess 36 and secured to first and second arm portions 32 and 33 by an epoxy 111 or any other suitable means. A preferred epoxy 111 is DURALCO 128 referred to above. The thermally conductive epoxy 111 additionally serves as a heat conductor path from drive coil 106 to static arm 22. Drive coil 106 is adapted to be electrically coupled to a power source 112 by an electrical wire 113. Power 30 source 112 provides a suitable electrical signal to drive coil 106 which, in turn, creates an electromagnetic field that extends through drive rod 102.

Actuator 101 has first and second insulating members 116 and 117 for electrically isolating drive rod 102 from static and dynamic arms 22 and 23. First insulating member or front isolator plug 116 is mounted on first end portion 102a of drive rod 102. Second insulating member or rear isolator plug 117 is mounted on second end portion 102b of the drive rod 102. Plugs 116 and 117 are each secured to the drive rod 102 by any suitable means such as cyanoacrylate (not shown). Each of the plugs 116 and 117 is generally disk-like in shape and has an outer diameter of approximately 0.011 inch and a thickness of approximately 0.004 inch. Isolator plugs 116 and 117 are each made from any suitable nonconductive material such as 960 Alumina sold by Cotronics located in Brooklyn, N.Y.

Means is carried by static arm 22 and drive rod 102 for connecting the drive rod to and between static and dynamic arms 22 and 23. Said means include first and second cylindrical members or connectors 121 and 122 mounted to the opposite ends of drive rod 102 and centered on longitudinal axis 103. Connectors 121 and 122 are each made from any suitable material such as 1018 steel. First or front connector 121 has an annular portion 121a secured to front isolator plug 116 by any suitable means such as cyanoacrylate (not shown) and a forwardly-extending conical portion 121b having a pointed end 123 for engaging the rear flat surface of plate portion 56. Second or rear connector 122 is generally annular in shape and has a rear planar surface 124 extending perpendicularly of central longitudinal axis 103. A conically-shaped recess or socket 126 extends through rear surface 124. Interconnecting portion 34 of static arm 22 is provided with a bore 127 extending longitudinally therethrough for threadably receiving a biasing screw member or screw 128 having a pointed front end 131. Screw 128 is disposed within bore 127 so that pointed end 131 seats within socket 126 of rear connector 122. Pointed or conical tapered ends 123 and 131 are aligned on axis 103. Connectors 121 and 122 also serve as means for intensifying the ac magnetic field generated by drive coil 106 and extending through drive rod 102. In this manner, the connectors or intensifiers 121 and 121 increase the efficiency of clamping device 21. Drive rod 102, front and rear isolator plugs 116 and 117 and front and rear connectors 121 and 122 form the drive rod assembly 132 of the present invention.

Static and dynamic arms 22 and 23 are longitudinally sized to amplify at grab pads 91 the elongation of drive rod 102 which pivots plate portion 56 about the axis of rotation of pivot pin 66. Specifically, the distance from the center of bore 73 in plate portion to the center of grab pad 91 of the dynamic arm 23 is approximately 1.3 inches. The moment arm at which conical end 123 of front connector 121 rotates plate portion 56 about the axis of rotation of pivot pin 66 is approximately 0.16 inch.

Clamping device 21 has spring means carried by at least one of arms 22 and 23 for urging dynamic arm 22 to its first or open position. Said spring means includes a conventional ball plunger 136 such as Part No. 34085A66 stainless steel sold by McMaster-Carr of Chicago, Ill. The ball plunger 136 is threaded within a tapped bore 137 extending perpendicularly through top surface 46 of static arm 22 and is secured within the bore by any suitable means such as Loctite 290 (not shown) made by Loctite Corp. located in Hartford, Conn. Ball plunger 136 includes a spring loaded ball 138 which extends upwardly from top surface 46 to engage bottom surface 54 of dynamic arm 23.

In operation and use, mounting portion 31 of clamping device 21 can be bolted to the mounting plate or surface of a wire bonding machine for use in gripping and releasing bonding wire 24 in a semiconductor manufacturing process. Power source 112 is electrically coupled to the clamping device 21 and provides an electrical signal to the clamping device which controls the opening and closing of dynamic arm 23 relative to static arm 22. Specifically, power source 112 provides an asymmetrical square wave which serves as an ON/OFF signal to clamping device 21. The electrical signal has a peak voltage ranging from 0 to 10 volts and preferably approximately 3 volts and a peak current ranging from zero to ten amps and preferably approximately three amps. It should be appreciated that clamping device 21 can be operated with alternating input signals having negative peak voltages and currents or both positive and negative peak voltages and currents and be within the scope of the present invention. The electrical signal has a frequency ranging from zero to twenty Hertz and preferably ranging from zero to ten Hz.

In the OFF portion of the cycle of clamping device 21, no current is provided to drive coil 106 and thus the active drive rod 102 is in a de-energized or shortened condition. Dynamic arm 23 is thus moved to an open position under the force of passive ball plunger 136 in which outer surfaces 92 of grab pads 91 are spaced apart so as to permit bonding wire 24 to be fed through the grab pads 91. In the ON portion of the cycle, current is supplied to drive coil 106 so as to create an electromagnetic field which extends through drive rod 102 and causes the drive rod to elongate along longitudinal axis 103. Pointed end 123 of front connector 121 pivots plate portion 56 about pivot pin 66 and causes grab pads 91 to generally close and clamp about bonding wire 24. The grab pads 91 open and close at the same frequency as the frequency of the input signal from power source 112.

Clamping device 21 permits the gap between grab pads 91 and the clamping force of the grab pads to be adjusted. Drive rod 102 can be moved forwardly and rearwardly within drive coil 106 by means of biasing screw 128. For example, clockwise rotation of biasing screw 128 causes the screw to move forwardly in bore 127 of static arm 22. The engagement of conical tapered end 131 with rear connector 122 moves drive rod assembly 132 toward the forward end of clamping device 21 and pivots plate portion 56 about pivot pin 66 to reduce the gap between grab pads 91. Conversely, counterclockwise rotation of biasing screw 128 increases the gap between the grab pads. In addition, the distance which grab pads 91 move between the open and closed positions of arms 22 and 23 can be adjusted by varying the amount of current provided to drive coil 106.

The pivotable coupling of arm 23 to arm 22 permits rotational dynamic motion of the dynamic arm 23 while restricting transverse movement of dynamic arm 23 relative to static arm 22. Such restriction of transverse movement precludes sliding movement between grab pads 91 and bonding wire 24. The inclusion of pivot pin 66 also increases the efficiency of clamping device 21 over clamping devices having flexures. In flexure-type devices, a portion of the energy applied to the arms for bending one or both of the arms is consumed by the flexure as an unrecoverable energy loss in the form of heat. Pivot pin 66 does not convert any energy to heat and thus does not suffer such losses.

The combination of a static arm and a dynamic arm rather than two dynamic arms simplifies the motion and hence the construction of clamping device 21. In addition, the nonmovable static arm 22 permits any vision system used in conjunction with clamping device 21 to be placed closer to the bonding location on the integrated circuit without fear of the vision system being contacted by the arm or the field of view of the vision system being obstructed by movement of the arm or of clamping device 21.

Distal extremities 22b and 23b of static and dynamic arms 22 and 23 are longitudinally sized so that grab pad 91 of dynamic arm 23 moves from its first position downwardly a distance which is at least five times and preferably approximately 9.25 times the distance which front connector 121 moves forwardly under the force of drive rod 102. In this regard, drive rod 102 elongates in length a distance of approximately 0.0004 inch between its energized or elongated shape and its de-energized or shortened shape. Grab pad 91 of dynamic arm 23 moves downwardly a distance of approximately 0.0039 inch when drive rod 102 is energized. This mechanical advantage of clamping device 21 further serves to cause the clamping force at grab pads 91 to be at least five times less than and more specifically approximately 9.25 times less than the axial force exerted by front connector 121 on plate portion 56 of dynamic arm 23. Grab pads 91 exert a clamping force on bonding wire 24 which ranges from 5 grams-force to 60 grams-force and preferably ranging from 10 grams-force to 50 grams-force.

The use of a magnetostrictive drive rod 102 in actuator 101 permits power source 112 to be relatively small in size. Large voltages are not required to produce the magnetic field necessary to actuate drive rod 102. Accordingly, the power costs for operating clamping device 21 are less than would be required if a piezoceramic material were utilized in the device 21.

The large thermal conduction coefficient of epoxy 111 permits ohmic heat generated within drive coil 106 to be dissipated through conduction to static and dynamic arms 22 and 23 and particularly to mounting portion 31. The relatively large surface area of mounting portion 31 contributes to the radiation of heat from clamping device 21. In this manner, arms 22 and 23 and mounting portion 31 thereof serve as a heat sink to drive coil 106 and contribute to the operating efficiency of actuator 101. In addition, the use of static arm 22 and/or dynamic arm 23 as a heat sink, as opposed to an auxiliary heat sinking device, permits the mass of clamping device 21 to be maintained in its minimum state.

Clamping device 21 has means for electrically isolating drive rod 102 from electrical energy of up to approximately 4000 volts carried by bonding wire 24. In this regard, the ceramic material of grab pads 91 serves to inhibit any such electrical energy in wire 24 from being transmitted through the grab pads to static and dynamic arms 22 and 23. The nonconductive material of front and rear isolator plugs inhibits any electrical energy carried by the arms 22 and 23 from being transmitted to drive rod 102.

Front connector 121 and screw 128 serve to inhibit the formation of bending moments in drive rod 102. The engagement of conical end 131 of screw 128 with socket 126 of rear connector 122 provides a generally point contact between drive rod assembly 132 and static arm 22. In a similar manner, the engagement of conical end 123 of front connector 121 with the rear of plate portion 56 of dynamic arm 23 provides a generally point contact between the drive rod assembly 132 and dynamic arm 23. Since such point contacts generally transmit only axial loads, and drive rod 102 generally floats within drive coil 106, shear and other loads transverse to longitudinal axis 103 as well as related bending moments are not experienced by drive rod 102. The preclusion of such bending moments in drive rod 102 permits a smaller allotment of magnetostrictive material to be used without breakage than would be needed if the drive rod 102 experienced such bending moments.

The interengagement of frustoconical portion 76 of pivot pin 66 with the corresponding tapered surface 79 of plate portion 63 inhibits undesirable backlash between static and dynamic arms 22 and 23. As tapered surfaces 77 and 79 wear during the operation of clamping device 21, slippage between pivot pin 66 and plate portion 63 is decreased by curved spring washer 83 continually urging tapered surface 76 and plate portion 63 against frustoconical portion 76.

It should be appreciated that magnetostrictive actuators having other configurations can be provided and be within the scope of the present invention. For example, an actuator having means for prestressing and/or magnetically biasing the magnetostrictive drive element can be provided. In addition, ac magnetic flux return means and/or motion amplifiers can also be provided in the actuator of the present invention. The clamping device of the present invention can be scaled smaller or larger for use in other operations.

From the foregoing, it can be seen that a clamping device which utilizes a smart material actuation element made from a giant magnetostrictive material has been provided. The clamping device is relatively small and lightweight and requires relatively low input voltages. The motion of the magnetostrictive material is significantly amplified by the device. A pivot pin is utilized for permitting relative movement of the clamping arms and the device inhibits backlash from the pin joint following wear of the joint.

What is claimed is:

1. A magnetostrictive clamping device comprising first and second arm members having respective first and second end portions, means for interconnecting the first and second arm members for permitting relative movement between the first and second end portions between a first position in which the first and second end portions are spaced apart and a second position in which the first and second end portions are spaced closer together and means including an actuator for causing the relative movement of the first and second arm members to one of the first and second positions, the actuator having a drive element made from a magnetostrictive material and a drive coil made from a conductive material disposed about the drive element for producing an electromagnetic field which extends through at least a portion of the drive element, the drive element changeable between a first shape when in the absence of the electromagnetic field and a second shape when in the presence of the electromagnetic field.

2. A magnetostrictive clamping device comprising first and second arm members having respective first and second end portions, means for interconnecting the first and second arm members for permitting relative movement between the first and second end portions between a first position in which the first and second end portions are spaced apart and a second position in which the first and second end portions are spaced closer together and means including an actuator for causing the relative movement of the first and second arm members to one of the first and second positions, the actuator having a drive element which is made from a magnetostrictive material and has first and second ends and means for producing an electromagnetic field which extends through at least a portion of the drive element, the drive element changeable between a first shape when in the absence of the electromagnetic field and a second shape when in the presence of the electromagnetic field, the actuator including first and second insulators carried by the first and second ends of the drive element for electrically insulating the drive element from the first and second arm members.

3. The clamping device of claim 1 wherein the drive element extends along a central longitudinal axis, first and second conical members having respective first and second pointed ends, each of the pointed ends disposed on the central longitudinal axis and serving as means for connecting the drive element to the first and second arm members and inhibiting the formation of bending moments in the drive element.

4. The clamping device of claim 1 wherein the drive element is made from a giant magnetostrictive material.

5. The clamping device of claim 4 wherein the drive element is made from a rare earth-transition metal material.

6. The clamping device of claim 5 wherein the drive element is made from a rare earth-iron material.

7. The clamping device of claim 6 wherein the drive element is made from TERFENOL-D.

8. The clamping device of claim 1 wherein the means for interconnecting the first and second arm members includes pivot means for pivotably coupling the first arm member to the second arm member.

9. A magnetostrictive clamping device comprising first and second arm members having respective first and second end portions, means including at least one pivot member having a pivot surface for pivotably coupling the first arm member to the second arm member so as to permit relative movement between the first and second end portions between a first position in which the first and second end portions are spaced apart and a second position in which the first and second end portions are spaced closer together and means including an actuator for causing the relative movement of the first and second arm members to one of the first and second positions, the actuator having a drive element made from a magnetostrictive material and means for producing an electromagnetic field which extends through at least a portion of the drive element, the drive element changeable between a first shape when in the absence of the electromagnetic field and a second shape when in the presence of the electromagnetic field.

10. The clamping device of claim 9 wherein the first and second arm members have a length so that the first and second end portions move a distance which is at least five times the movement of the actuator.

11. The clamping device of claim 10 wherein the first and second arm members have a length so that the first and second end portions move a distance which is approximately nine times the movement of the actuator.

12. The clamping device of claim 9 wherein the pivot member has a frustoconical portion and one of the first and second arm members is provided with a recess formed from a tapered surface for cooperatively receiving the frustoconical portion of the pivot member, spring means for urging the frustoconical portion against the tapered surface to inhibit backlash between the first and second arm members.

13. A magnetostrictive clamping device comprising first and second arm members having respective first and second end portions, means for interconnecting the first and second arm members for permitting relative movement between the first and second end portions between a first position in which the first and second end portions are spaced apart and a second position in which the first and second end portions are spaced closer together and means including an actuator for causing the relative movement of the first and second arm members to one of the first and second positions, the actuator having a drive element made from a magnetostrictive material and means for producing an electromagnetic field which extends through at least a portion of the drive element, the drive element changeable between a first shape when in the absence of the electromagnetic field and a second shape when in the presence of the electromagnetic field, spring means carried by at least one of the first and second arm members for urging the first and second arm members to the other of the first and second positions.

14. A magnetostrictive clamping device comprising first and second arm members having respective first and second end portions, means for pivotably coupling the first arm member to the second arm member for permitting the first end portion to move between a first position in which the first end portion is spaced apart from the second end portion and a second position in which the first end portion is spaced closer to the second end portion, an actuator carried by the second arm member for moving the first arm member from the first position to the second position, the actuator having an elongate drive element made from a giant magnetostrictive material and a coil made from an electrically conductive material concentrically disposed about the drive element for producing an electromagnetic field which extends through the drive element, the drive element being changeable between a shortened shape when in the absence of the electromagnetic field and an elongated shape when in the presence of the electromagnetic field.

15. The clamping device of claim 14 further comprising means for thermally connecting the coil to the first arm member so that the first arm member serves as a heat sink for the coil.

16. The clamping device of claim 14 wherein the device has a mass of approximately 10 grams or less.

17. The clamping device of claim 14 wherein the drive element has a length change between the elongated shape and the shortened shape, the first and second arm members having a length sufficient for the first end portion to move a distance from its first position to its second position which is at least approximately nine times such length change.

18. The clamping device of claim 2 wherein the drive element is cylindrical in shape and wherein the means for producing an electromagnetic field is a coil made from a conductive material concentrically disposed about the drive element.

19. The clamping device of claim 9 wherein the pivot member extends transversely through the first and second arm members.

20. The clamping device of claim 13 wherein the drive element is cylindrical in shape and wherein the means for producing an electromagnetic field is a coil made from a conductive material concentrically disposed about the drive element.

21. A magnetostrictive clamping device comprising first and second arm members having respective first and second end portions, means for pivotably coupling the first arm member to the second arm member for permitting the first end portion to move between a first position in which the first end portion is spaced apart from the second end portion and a second position in which the first end portion is spaced closer to the second end portion, an actuator carried by the second arm member for moving the first arm member to one of the first and second positions, the actuator having an elongate drive element made from a magnetostrictive material and a coil made from an electrically conductive material concentrically disposed about the drive element for producing an electromagnetic field which extends through the drive element, the drive element being changeable between a first shape when in the absence of the electromagnetic field and a second shape when in the presence of the electromagnetic field.

22. The clamping device of claim 21 further comprising means for thermally connecting the coil to the first arm member so that the first arm member serves as a heat sink for the coil.

23. The clamping device of claim 21 wherein the drive element has a length change between the elongated shape and the shortened shape, the first and second arm members having a length sufficient for the first end portion to move a distance from its first position to its second position which is at least approximately nine times such length change.

\* \* \* \* \*